(12) United States Patent
Mon

(10) Patent No.: US 11,646,558 B2
(45) Date of Patent: May 9, 2023

(54) AIR SEALING ELECTRICAL BOX

(71) Applicant: George Emmanuel Mon, Ladera Ranch, CA (US)

(72) Inventor: George Emmanuel Mon, Ladera Ranch, CA (US)

(*) Notice: Subject to any disclaimer, the term of this patent is extended or adjusted under 35 U.S.C. 154(b) by 0 days.

(21) Appl. No.: 17/493,558

(22) Filed: Oct. 4, 2021

(65) Prior Publication Data

US 2023/0106607 A1 Apr. 6, 2023

(51) Int. Cl.
*H02G 3/08* (2006.01)
*H02G 3/12* (2006.01)

(52) U.S. Cl.
CPC ............ *H02G 3/083* (2013.01); *H02G 3/121* (2013.01)

(58) Field of Classification Search
CPC .. H05K 9/0015; H05K 9/0018; H05K 9/0016; H05K 3/284; H05K 3/325; H05K 5/0013; H05K 5/03; H05K 5/061; H05K 9/0049; H05K 9/0073; H05K 2201/10166; H05K 5/0204; H05K 7/20854; H05K 9/00; H05K 1/141; H05K 2201/10371; H05K 2201/10393; H05K 3/0061; H05K 5/0095; H05K 5/0269; H05K 5/06; H05K 1/0306; H05K 1/167; H05K 1/183; H05K 2201/10303; H05K 2201/10689; H05K 3/341; H05K 5/00; H05K 5/0247; H05K 7/20927; H05K 9/002; H05K 1/0215; H05K 1/0263; H05K 1/147; H05K 1/189; H05K 11/02; H05K 2201/0397; H05K 2201/09781; H05K 2201/10325; H05K 2201/10446; H05K 2201/10659; H05K 2201/10674; H05K 2201/10734; H05K 2203/302; H05K 3/28; H05K 3/301; H05K 3/3447; H05K 5/0039; H05K 5/0086; H05K 5/0091; H05K 5/064; H05K 5/069; H05K 7/026; H05K 7/1053; H05K 7/1092; H05K 7/2049; H05K 7/20736; H05K 9/0009; H05K 9/0022; H05K 9/003; H05K 9/0035; H05K 9/0039; H05K 9/0058; H05K 9/0067; H05K 9/0098; H05K 1/0206; H05K 1/0209; H05K 1/021; H05K 1/0233; H05K 1/0271; H05K 1/028; H05K 1/118; H05K 1/182; H05K 2201/0215; H05K 2201/066; H05K 2201/083; H05K 2201/0909; H05K 2201/09118; H05K 2201/0919; H05K 2201/0969; H05K 2201/09954; H05K 2201/10189; H05K 2201/10409;

(Continued)

(56) References Cited

U.S. PATENT DOCUMENTS 4,192,520 A * 3/1980 Hasegawa ............ F16J 15/022
277/648
5,418,685 A * 5/1995 Hussmann ......... H05K 7/20518
361/818

(Continued)

*Primary Examiner* — Krystal Robinson

(57) ABSTRACT

An electrical box with a peripheral flange and channel element which in shape and placement provides and vapor sealing of wall assemblies and also facilitates wall assembly construction. The flange will consist of a generally flat surface connected to a channel which in turn will be attached to electrical box bodies of various sizes and shapes. In addition, the electrical box may employ rectangular elements with optional integral holes attached to the box body for fastening the box to wall or ceiling assembly materials.

22 Claims, 13 Drawing Sheets

(58) Field of Classification Search
CPC .......... H05K 2201/10568; H05K 2201/10598; H05K 2201/10719; H05K 2201/10969; H05K 2203/1105; H05K 2203/1316; H05K 2203/167; H05K 2203/171; H05K 2203/304; H05K 3/0014; H05K 3/027; H05K 3/20; H05K 3/202; H05K 3/306; H05K 3/3426; H05K 3/3436; H05K 3/36; H05K 3/4069; H05K 3/4614; H05K 5/0017; H05K 5/0047; H05K 5/0052; H05K 5/006; H05K 5/0208
See application file for complete search history.

(56) References Cited

U.S. PATENT DOCUMENTS

| | | | | |
|---|---|---|---|---|
| 6,561,522 | B1* | 5/2003 | Radelet | H05K 5/061 |
| | | | | 277/626 |
| 9,917,427 | B2* | 3/2018 | Rost | H02G 9/00 |
| 11,050,229 | B2* | 6/2021 | Baker | H02G 3/088 |
| 11,075,509 | B2* | 7/2021 | Hughey | H02G 3/12 |
| 2001/0040037 | A1* | 11/2001 | Negishi | H05K 5/061 |
| | | | | 174/17 CT |
| 2003/0089710 | A1* | 5/2003 | Gates, II | H02G 3/14 |
| | | | | 220/3.94 |
| 2006/0216988 | A1* | 9/2006 | Scott | H01R 43/24 |
| | | | | 439/535 |
| 2012/0094511 | A1* | 4/2012 | Sil | H01R 24/78 |
| | | | | 439/535 |
| 2013/0264088 | A1* | 10/2013 | Dinh | H05K 5/06 |
| | | | | 174/50.54 |
| 2014/0000956 | A1* | 1/2014 | Wurms | H02G 3/08 |
| | | | | 174/535 |
| 2016/0172832 | A1* | 6/2016 | Geno | H02G 3/086 |
| | | | | 174/502 |
| 2018/0123332 | A1* | 5/2018 | Laukhuf | H02G 3/126 |

* cited by examiner

AIR SEALING ELECTRICAL BOX

FIELD OF THE INVENTION

The present invention relates to electrical boxes used in new construction electrical systems and specifically regards sealing the wall and ceiling assemblies around these boxes and, additionally, regards methods of installing the boxes in typical construction.

BACKGROUND OF THE INVENTION

Electrical enclosures are required by National Electrical Code for handling cable and connecting receptacles and switches to conductors in wall assemblies.

They are generally of different types designed to be used in new or existing construction and to accommodate various quantities of cabling and outlets.

New energy codes used throughout North America require decreased air flow through wall and ceiling assemblies including at these electrical boxes for compliance. As such, the interface between the electrical box and other components needs to be designed to minimize this airflow.

At the same time, methods used to control airflow around electrical boxes should not disrupt typical construction methods including those of wallboard installers.

SUMMARY OF THE INVENTION

As in typical electrical boxes, the air sealing electrical box has a plastic body including four sides and a back all formed together where they meet with the front face open (for rectangular boxes) or a cylindrical or ovalized shape and back formed together where they meet with the front face open (for round boxes).

The air sealing electrical box of the application is distinct in that it possesses a flange and channel element comprised of an air and vapor sealing flange joined to an integral channel to enable air and/or vapor sealing of buildings at electrical boxes while allowing for more precise routing of wallboard around boxes by wallboard installers during new construction. The flange and channel element is what differentiates the air sealing electrical box of the application from prior art.

Virtually all wallboard installers now use powered routers to cut around electrical boxes during wallboard installation. These routers use bits which have cutting capabilities along the length of the bit but not at or near the tip. The router bits must penetrate past the back face of the wallboard by a certain distance to assure a clean cut. When using routers on electrical boxes with flanges which connect to the main body of the box directly, the router bit penetration distance is difficult to manage without the bit coming onto contact with the flange. Bits coming into contact with the flange cause the router bit to "wander" producing irregular cuts and wallboard damage.

The air sealing electrical box flange and channel element permits the wallboard cutting router bit to fully penetrate the wallboard with a margin without contacting the flange face and thus allow the wallboard to be more precisely and cleanly cut with minimal damage. The flange and channel element occurs at the entire periphery of the box with the same profile in section on all four exterior sides or around the circular or ovalized exterior side in the case of round enclosures. The electrical box flange and channel element additionally functions as a template and guide for the for the router/router bit allowing the installer to more precisely and quickly follow the outline of the box resulting in more precise rectangular openings with no wandering or overcuts. The channel also alerts the installer to the end of the box side requiring a change in route direction. A neat, more precise wallboard cut assists in air sealing around the box and eliminates the need to make wallboard repairs.

Because the flange face is located at a prescribed distance from the front open face edge of the electrical box, the installing electrician does not need to measure the distance from the edge of the framing member to the front open face edge of the electrical box.

Thus, the flange and channel element makes the depth placement of the box self-calibrating for installing electricians. This facilitates quick, proper and consistent placement of electric boxes during new construction. Holes in the flange face optionally allow attachment to framing elements with commonly used fasteners.

Additionally, the flange face serves as a substrate for optional placement of sealing tapes and gaskets which provide for exceptionally tight air and vapor sealing. The use of plastic sheeting is neither necessary nor, in most climates, desirable because of wall assembly vapor drive issues. Furthermore, plastic sheeting placed in this location is undesirable as it can become entangled with router bits during wallboard cutout.

The presence of the flange channel discussed above can diminish the ability of the electrical box to sit against the framing member. In order to compensate for this, support and fastening blocks may be added to the air sealing electrical box body exterior sides to enable the box to sit against the framing member in a stable and generally horizontal or vertical manner.

The support and fastening blocks also permit the box to be fastened securely in variety of ways with a variety of fasteners. The box can be placed to the left or right of a framing member by rotating it 180 degrees as it symmetrical about the longitudinal axis. The box can be placed at any point between vertical framing with just a short horizontal framing element by using either of the two short side fastening blocks. This is especially helpful for 24" on center framing used in more efficient wall assemblies. Fastening the box using these blocks provide for convenient installation not just of single device boxes but of larger multi device boxes of various sizes (2, 3, 4 gang boxes etc.).

Other methods may be used to provide for box fastening to framing. The flange face optionally possesses integrally formed holes to enable the electrical box to be attached with nails or screws.

DETAILED DESCRIPTION OF THE INVENTION

Figure 1:
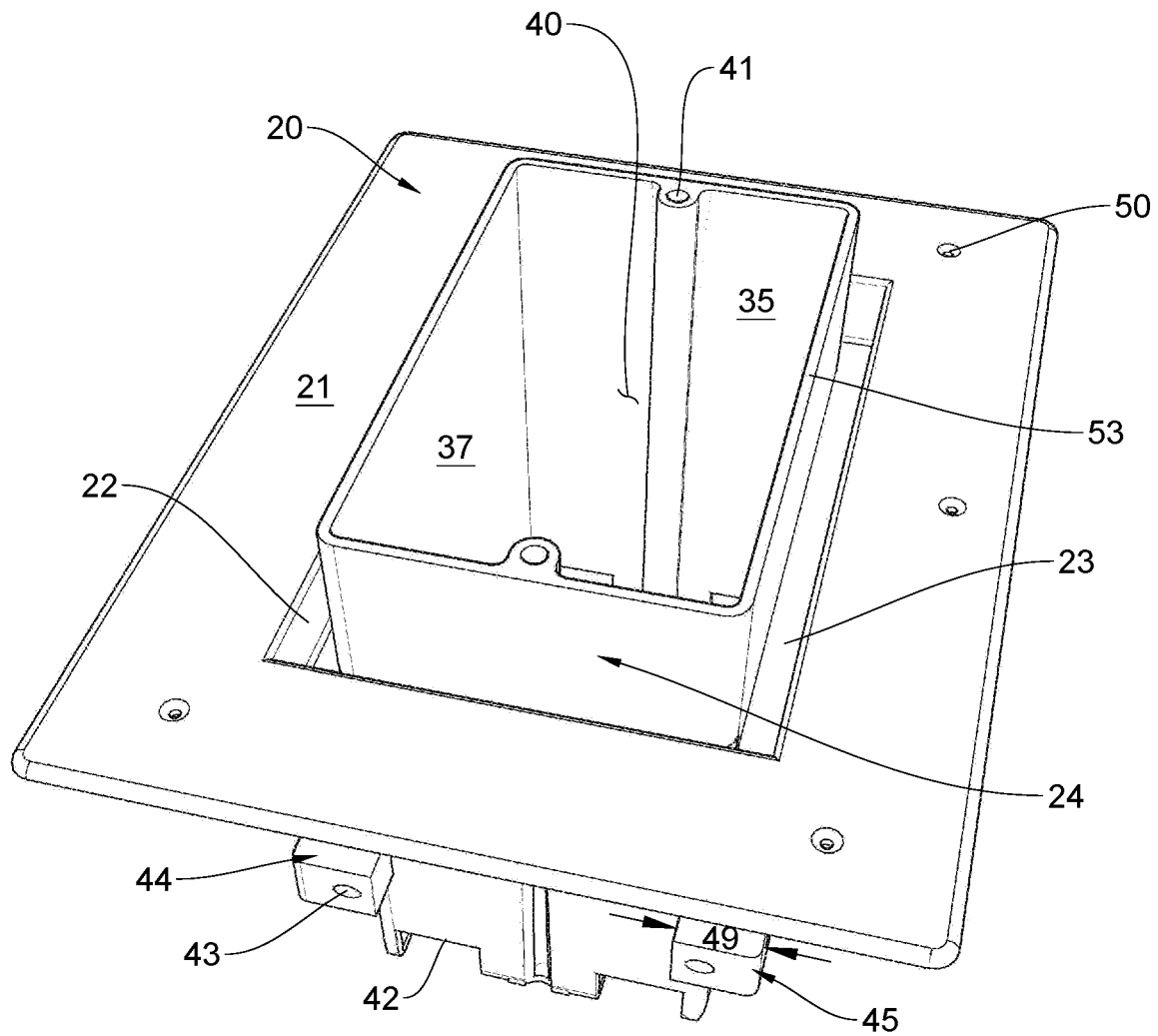
FIG. 1 is a top perspective view of the preferred embodiment of the invention.

The air sealing electrical box consists of a single unitary device formed by a flange and channel element attached to a typical plastic electrical outlet box body. The box body may be fastened to framing with standard fasteners placed through support and fastening blocks which may be formed during box body fabrication and/or by fasteners placed through preformed openings in the flange face.

Two embodiments of the flange and channel element are presented and thus two embodiments of the air sealing electrical box are presented. Both function in the same manner—they are conceptually the same. The method of joining the flange and channel element to the box body differs for the two embodiments.

The preferred embodiment attaches a plastic flange and channel element directly to the plastic box body.

Referring to FIGS. 1, 9 and 11-13: The flange and channel element (20) consists of a flange face portion (21), connected orthogonally to a flange channel outside vertical portion (22) which in turn is connected orthogonally to a flange channel bottom portion (23). The flange channel outside vertical portion (22) and thus flange channel should be of sufficient depth to permit a router bit to penetrate past the flange face by a margin without contacting the flange channel bottom portion (23). The channel bottom portion (23) and thus the channel itself should be of sufficient width for insertion of a router bit plus a margin so as to prevent the bit from binding in the channel even while the router is being moved. Note that use of the word vertical throughout this detailed description and the claims is construed to mean generally parallel to the exterior sides of the box body.

The flange and channel element preferred embodiment may be formed as one element together with the box body (24) or formed as one element separately from the box body and subsequentially joined to the box body using multi-shot fabrication.

Referring to FIGS. 2-8, 10 and 14-16: The alternative embodiment attaches an alternative flange and channel element (25) by means of a flange attachment collar around the exterior periphery of a plastic box body.

Figure 10:
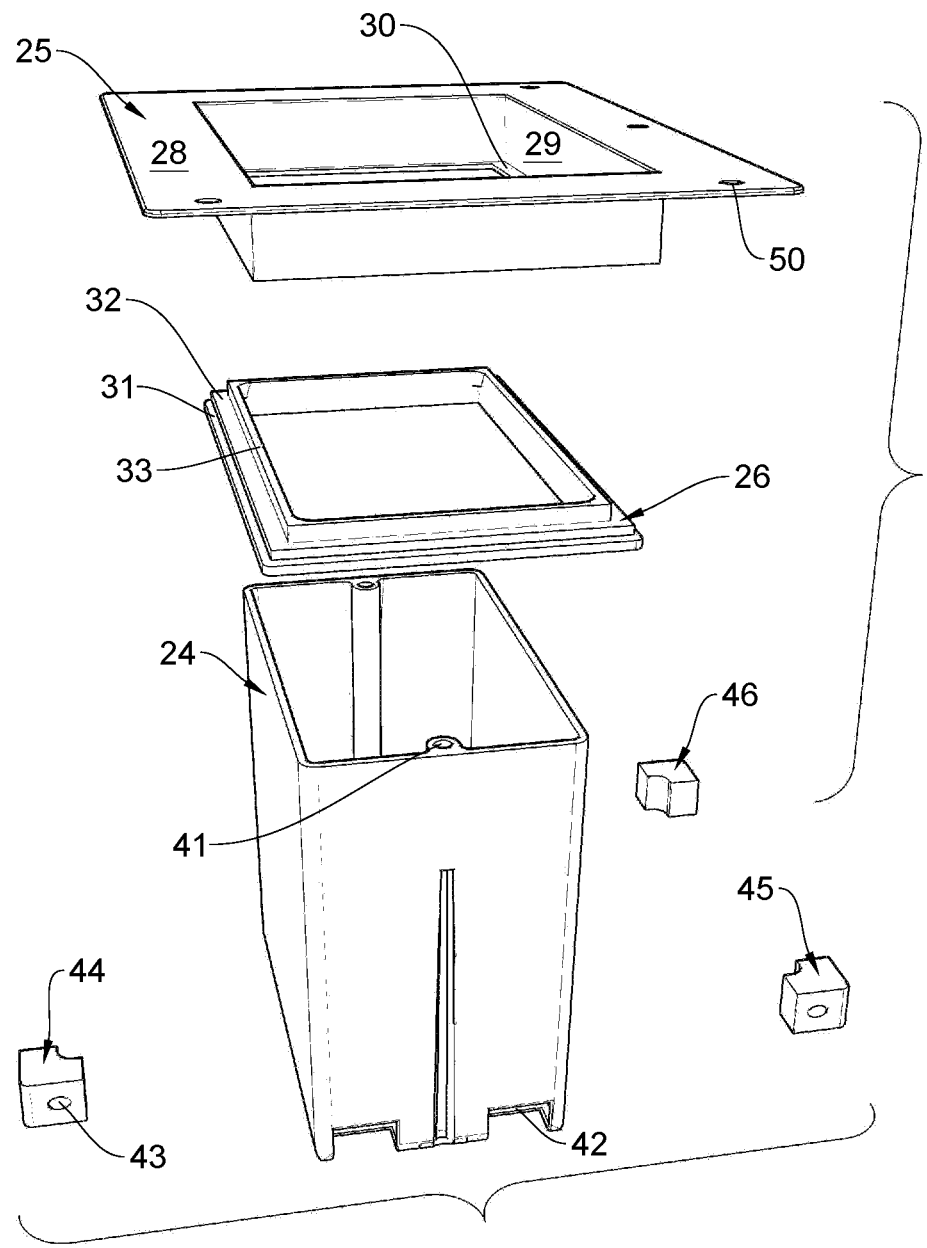
FIG. 10 is an exploded perspective view of the alternative embodiment of the invention.
Figure 11:
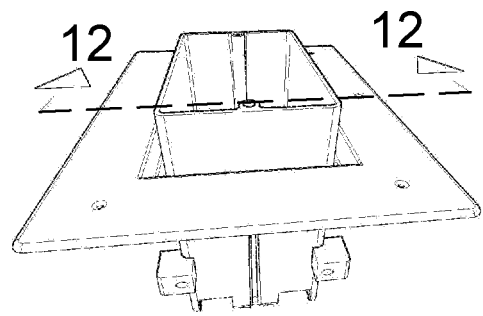
FIGS. 11 and 12 define and show a perspective view section of the preferred embodiment of the invention.
Figure 12:
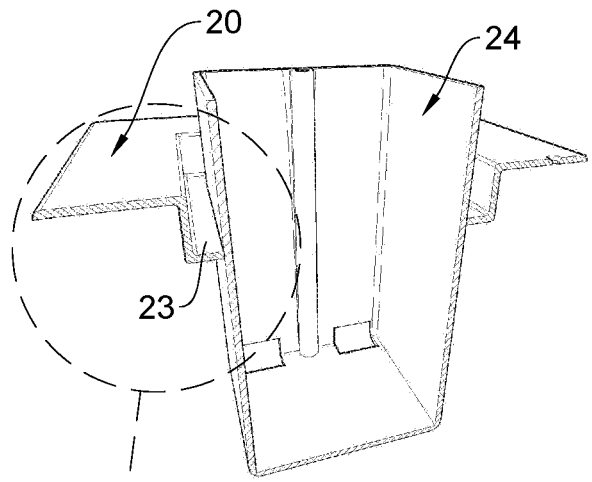
Figure 13:
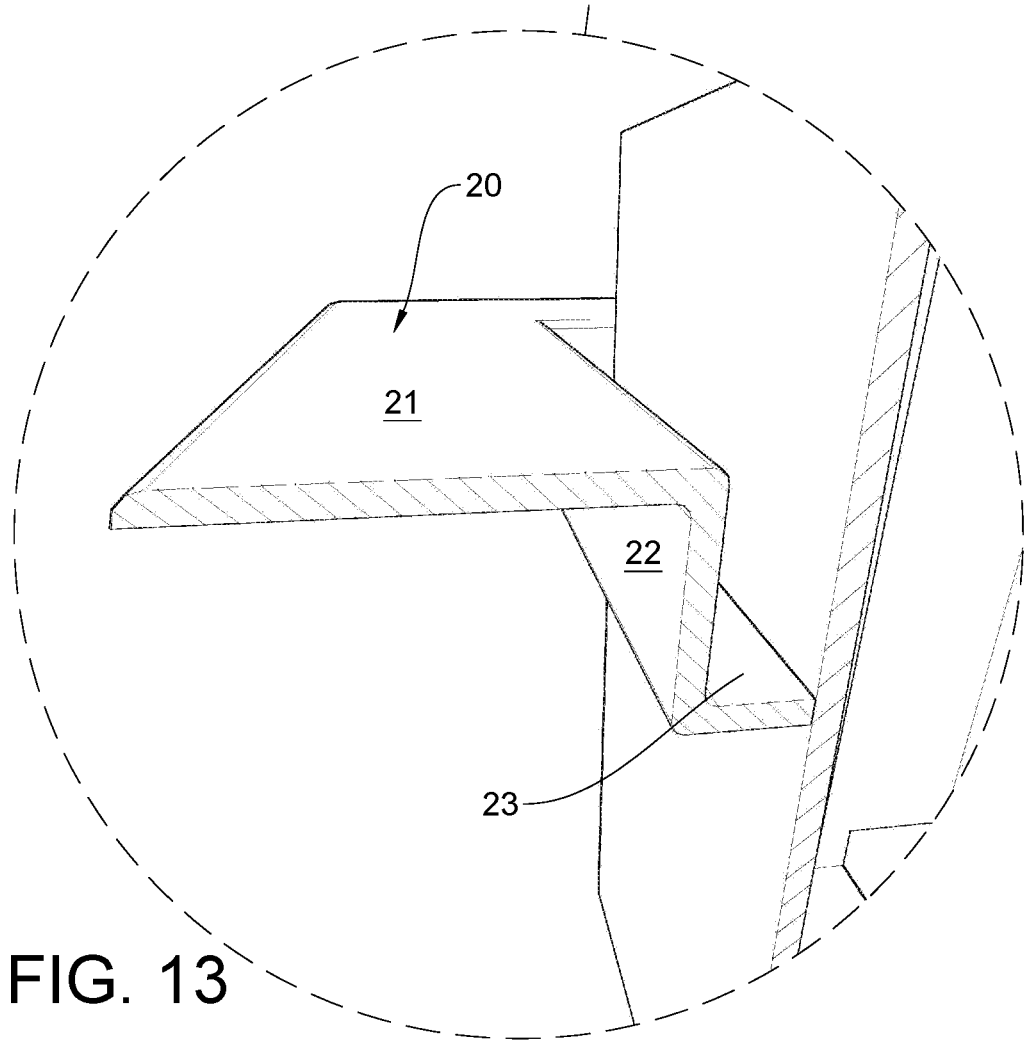
FIG. 13 is a perspective view detail of the FIG. 12 preferred embodiment section.
Figure 14:
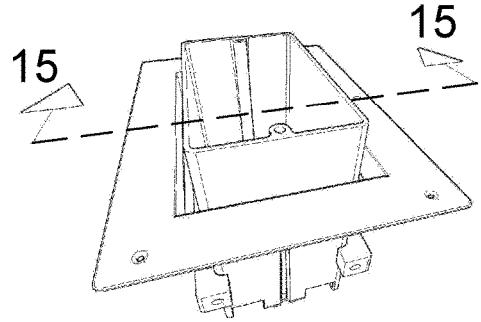
FIGS. 14 and 15 define and show a perspective view section of the alternative embodiment of the invention.
Figure 15:
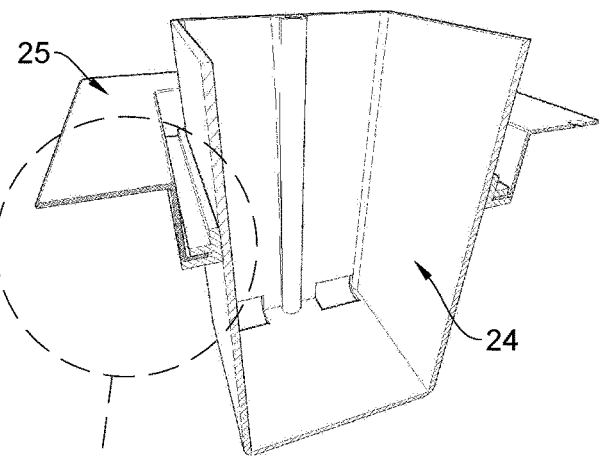
Figure 16:
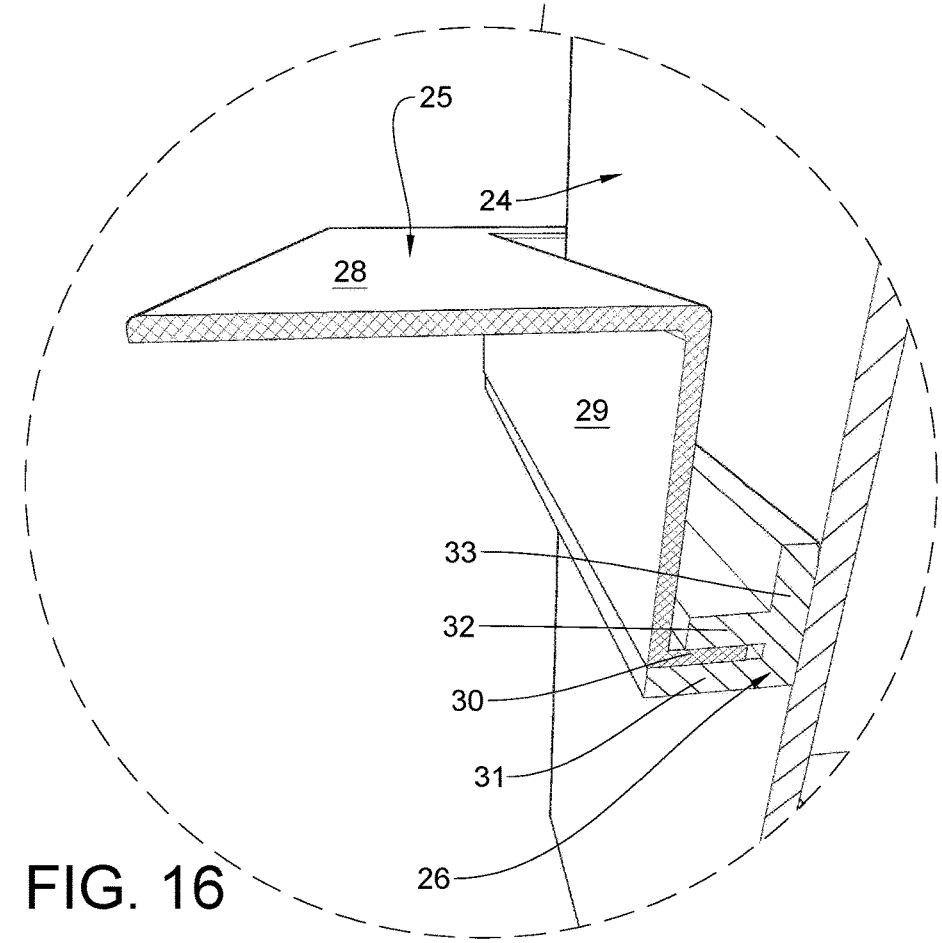
FIG. 16 is a perspective view detail of the FIG. 15 alternative embodiment section.

The alternative flange and channel element (25) consists of an alternative flange face portion (28), connected orthogonally to an alternative flange channel outside vertical portion (29) which in turn is connected orthogonally to an alternative flange channel bottom portion (30; FIGS. 10 and 16 only). As with the preferred embodiment, the alternative flange channel outside vertical portion and thus flange channel should be of sufficient depth to permit a router bit to penetrate past the flange face by a margin without contacting the alternative flange channel bottom portion (30). The alternative flange and channel element 25 can be formed as one piece from, as non-limiting examples, metal such as mild galvanized steel by any one of a number of metal stamping or forming methods or, as with the preferred embodiment, of plastic using plastic fabrication methods.

Referring to FIGS. 10, 14-16: The alternative flange and channel element (25) is attached to the electrical box body (24) through the use of a flange attachment collar (26). The flange attachment collar may be fabricated of the same type of plastic as the box body and consists of a collar bottom portion (31) and a collar top portion (32) both connected to the box body by a collar vertical portion (33). The length of the collar vertical portion that occurs above the plane of the collar top portion (32) may be omitted.

The alternative flange and channel element (25) attaches to the collar and thus the electrical box body by being placed in the space between the collar bottom (31) and collar top (32) portions during manufacture whether by typical plastic injection molding at the same time the box is formed, by multishot injection molding subsequent to box body fabrication or by overmolding subsequent to box body fabrication.

Figure 3:
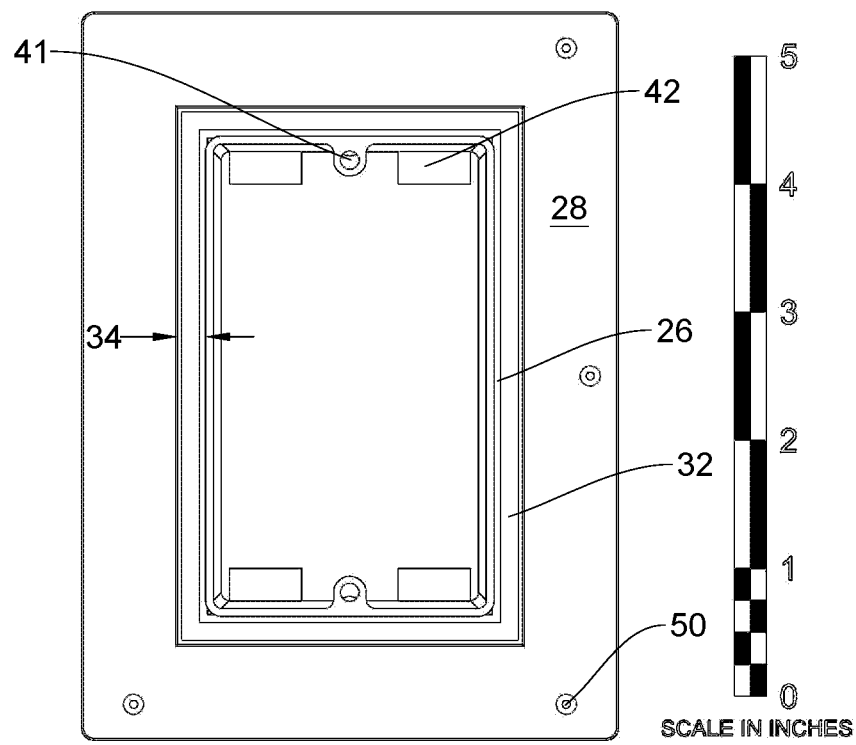
FIG. 3 is a top orthographic view of the alternative embodiment of the invention.
Figure 4:
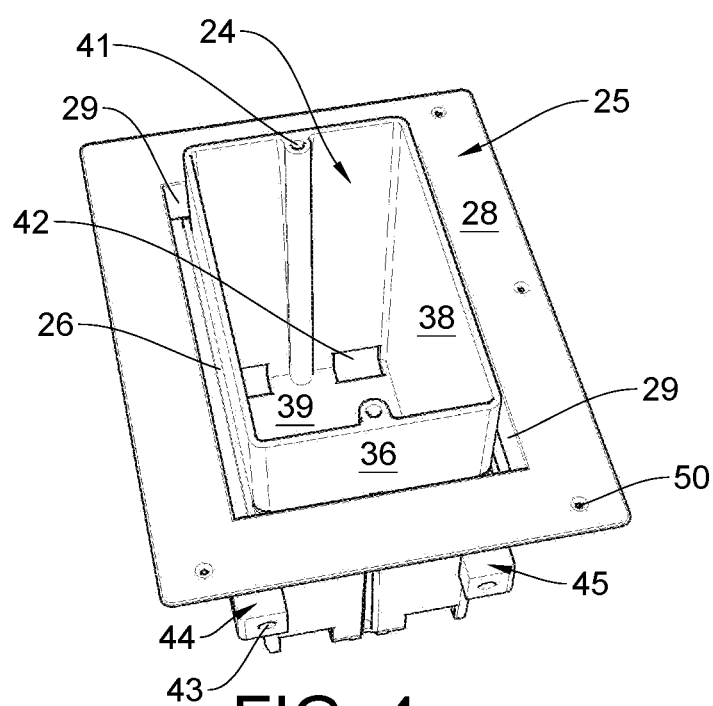
FIG. 4 is a top perspective view of the alternative embodiment of the invention.

The overlap between collar portions (31) and (32) and the alternative flange channel bottom portion (30) is determined by manufacturing considerations. The sum (34; FIG. 3 only) of the non-overlap distance plus the length of the collar top portion must be great enough to allow for insertion of router bit plus a margin so as to prevent the bit from binding in the channel even while the router is being moved.

Both embodiments of the flange and channel element are attached to electrical box bodies that may have the same form and features as follows.

Figure 2:
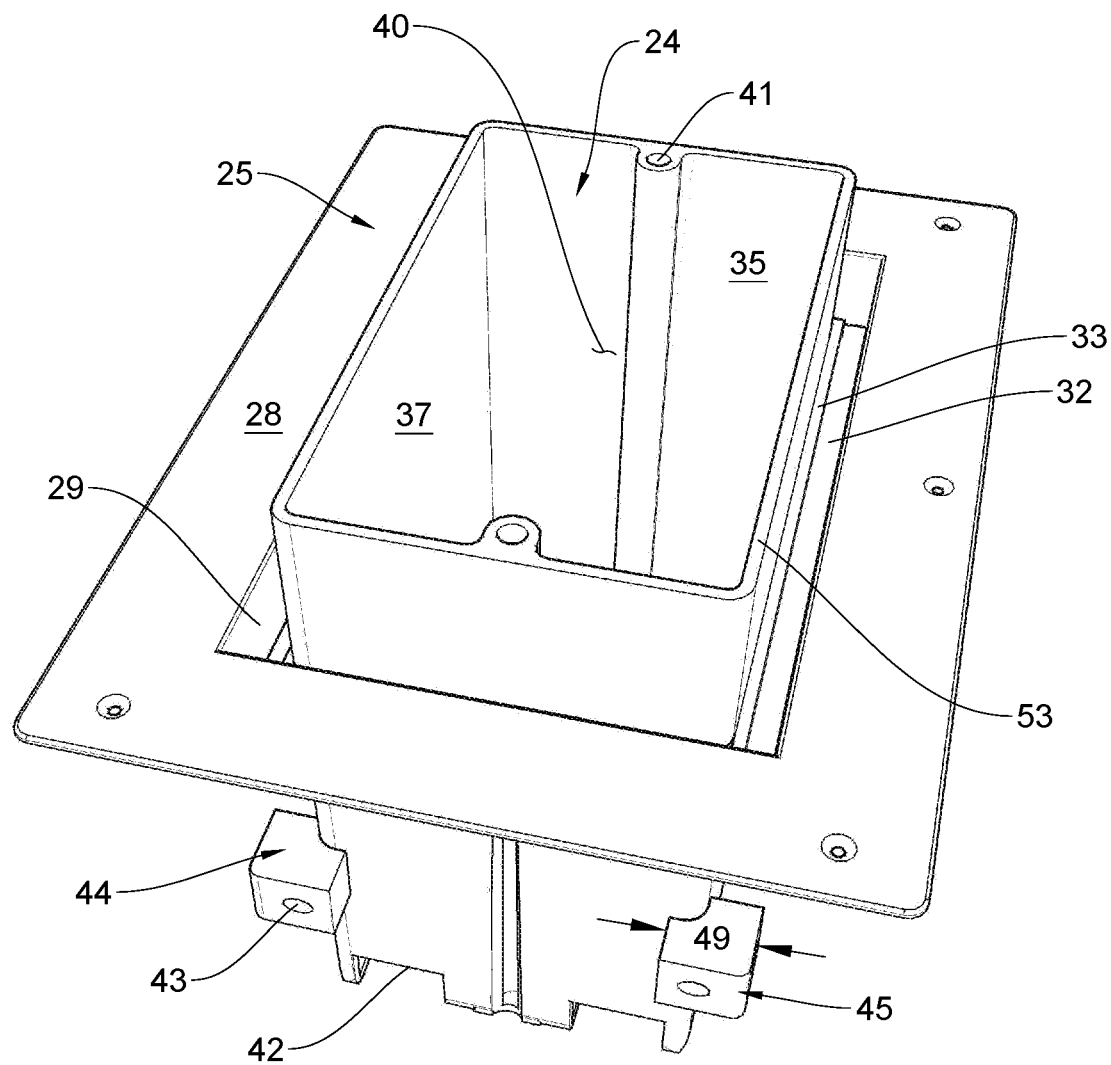
FIG. 2 is a top perspective view of the alternative embodiment of the invention.

Referring to FIGS. 1-10: The electrical box body has typical features including short sides (35) and (36), long sides (37) and (38) all connected to a back (39) at angles which may be orthogonal or which cause the box open face to be larger than the back in the case of tapered box bodies. The front face (40; FIGS. 1 and 2 only) is open. The short sides (35) and (36) in the case of single device boxes have molded and threaded mounting holes (41) orthogonal to the face with standard threading to accomplish fastening of receptacle or switch yokes to the box with screws. These mounting holes and the box elements that form them are placed inside the box body so as to provide a linear wallboard route on the exterior sides of the box body.

Preformed openings (42) with removable tabs (not shown) or weak point knock outs (not shown) may be placed at or near the back of the box to allow for cable entrance to the box. These may be located at a chamfered or filleted area of the box formed between the short sides (35) and (36) in the case of single device boxes and the back of the box (39). The box may contain devices such as clamps or grommets to assist in securing and protecting the cable. It is understood that these cable entrance locations shall be sealed using foams or other sealants once electrical cables are placed and prior to wallboard installation to achieve proper air and vapor sealing.

Both embodiments of the air sealing electrical box with flange and channel element can optionally be used in conjunction with commercially available sealing tapes or gaskets. Both embodiments of the flange face should be manufactured to be sufficiently rigid to enable optional placement of these seals or gaskets.

Figure 17:
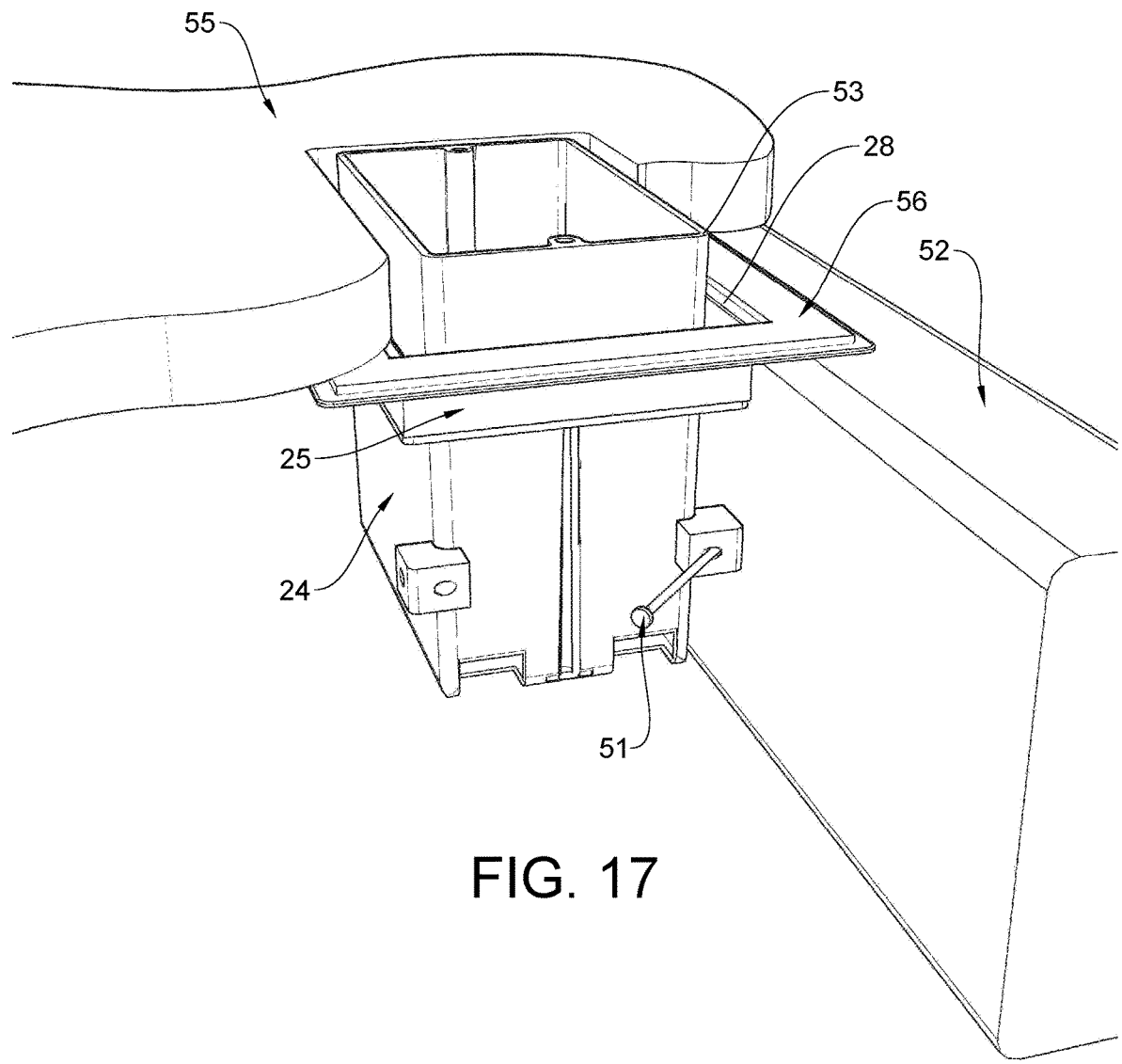
FIG. 17 is a perspective view of a partial wall assembly with the alternative embodiment box attached to vertical framing using support and fastening blocks to attach box long side to framing as representative of both box embodiments.
Figure 18:
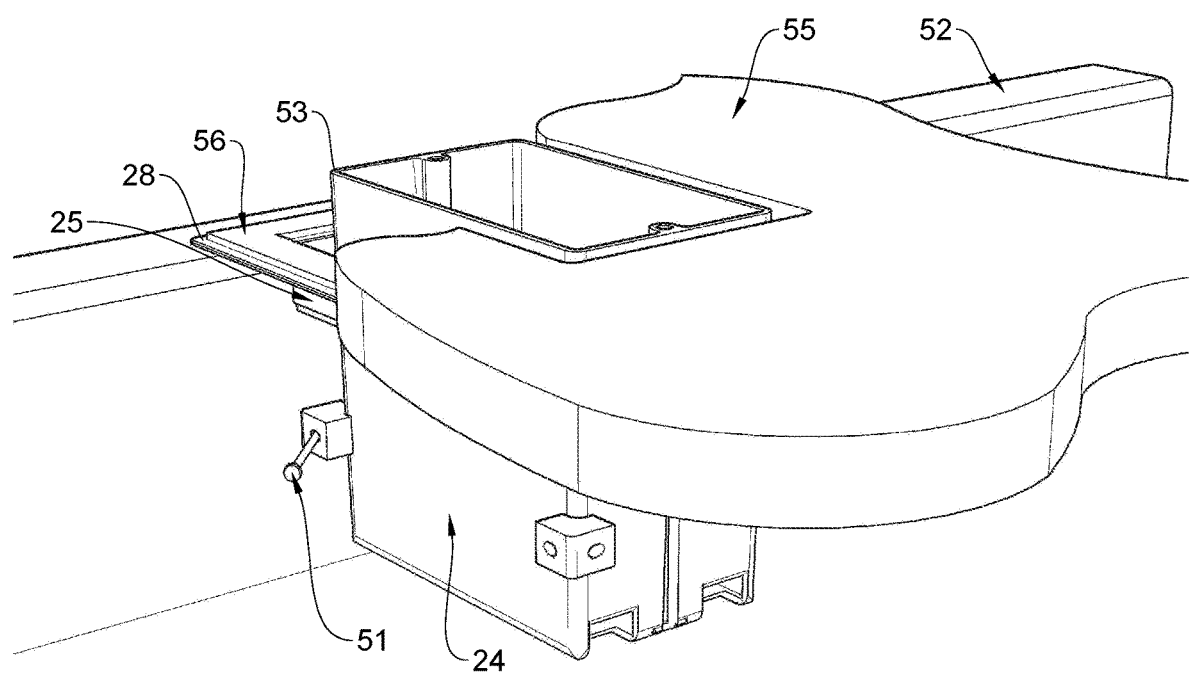
FIG. 18 is a perspective view of a partial wall assembly with the alternative embodiment box attached to horizontal framing using support and fastening blocks to attach box short side to framing as representative of both box embodiments.
Figure 19:
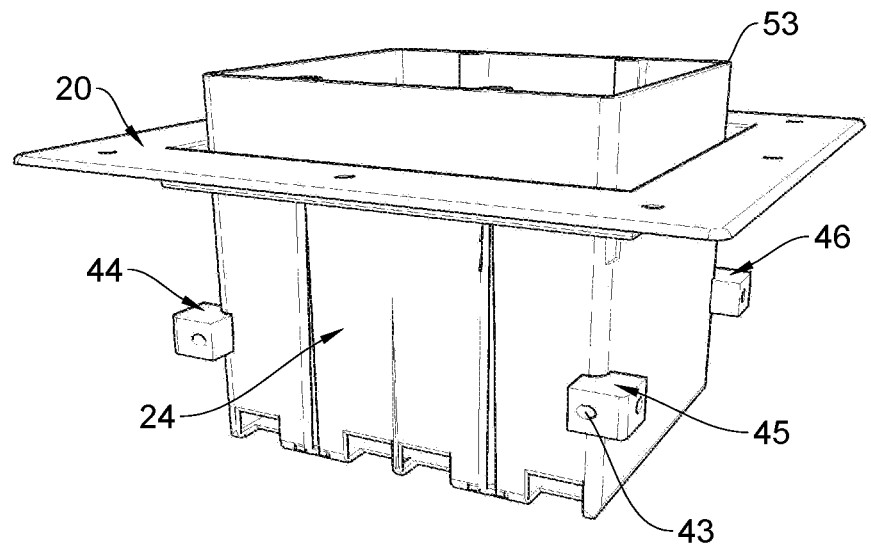
FIG. 19 is a perspective view of the multi device embodiment of the invention.
Figure 20:
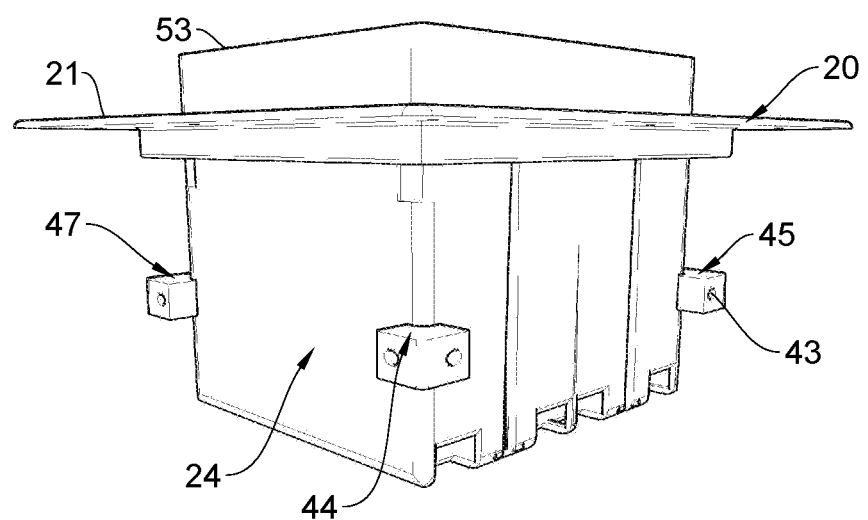
FIG. 20 is an alternate perspective view of the multi device embodiment of the invention.

Referring to FIGS. 1, 2, 4-10, 17-18: The entire device can be fastened to framing using standard fasteners, screws or nails, placed through cylindrical openings (43) in support and fastening blocks (44, 45, 46) located at a plurality of sides of single device boxes and optionally all four sides of multi device boxes (44, 45, 46, 47; FIGS. 19 and 20 only). The openings (43) in the fastening blocks may occur at a 45-degree angle to the box sides to allow for fastening long side to vertical framing as shown in FIG. 17 or short side of box to horizontal framing as shown in FIG. 18.

Figure 5:
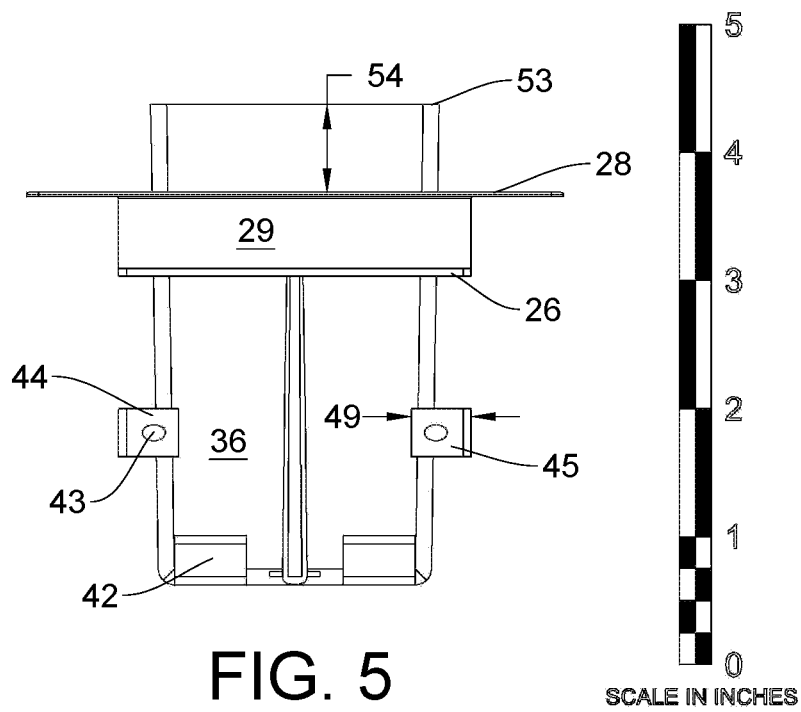
FIG. 5 is a short side orthographic view of the alternative embodiment of the invention.
Figure 6:
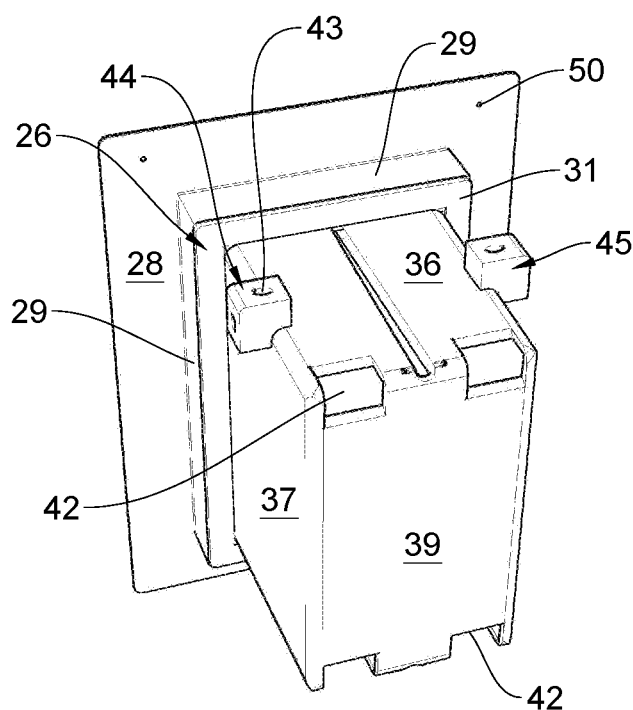
FIG. 6 is a perspective view of the alternative embodiment of the invention viewed from the short side/bottom intersection.
Figure 7:
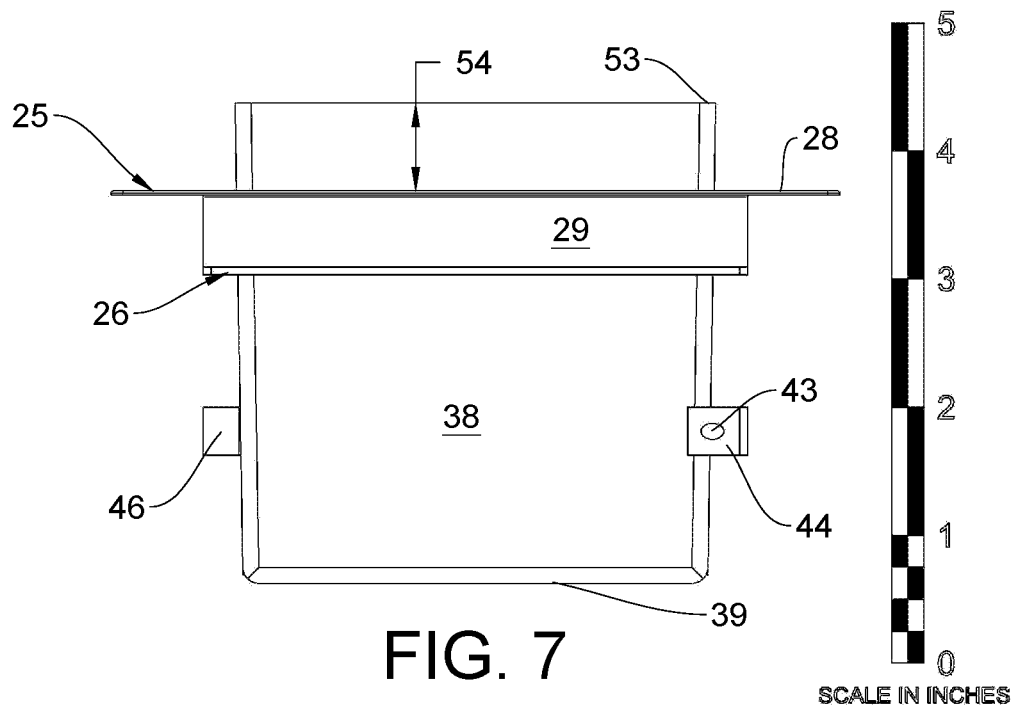
FIG. 7 is a long side orthographic view of the alternative embodiment of the invention.
Figure 8:
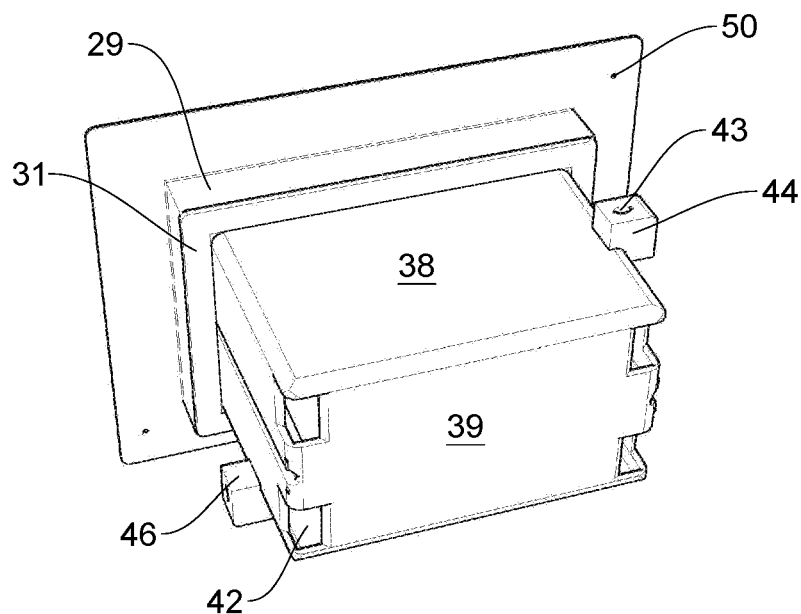
FIG. 8 is a perspective view of the alternative embodiment of the invention viewed from the long side/bottom intersection.
Figure 9:
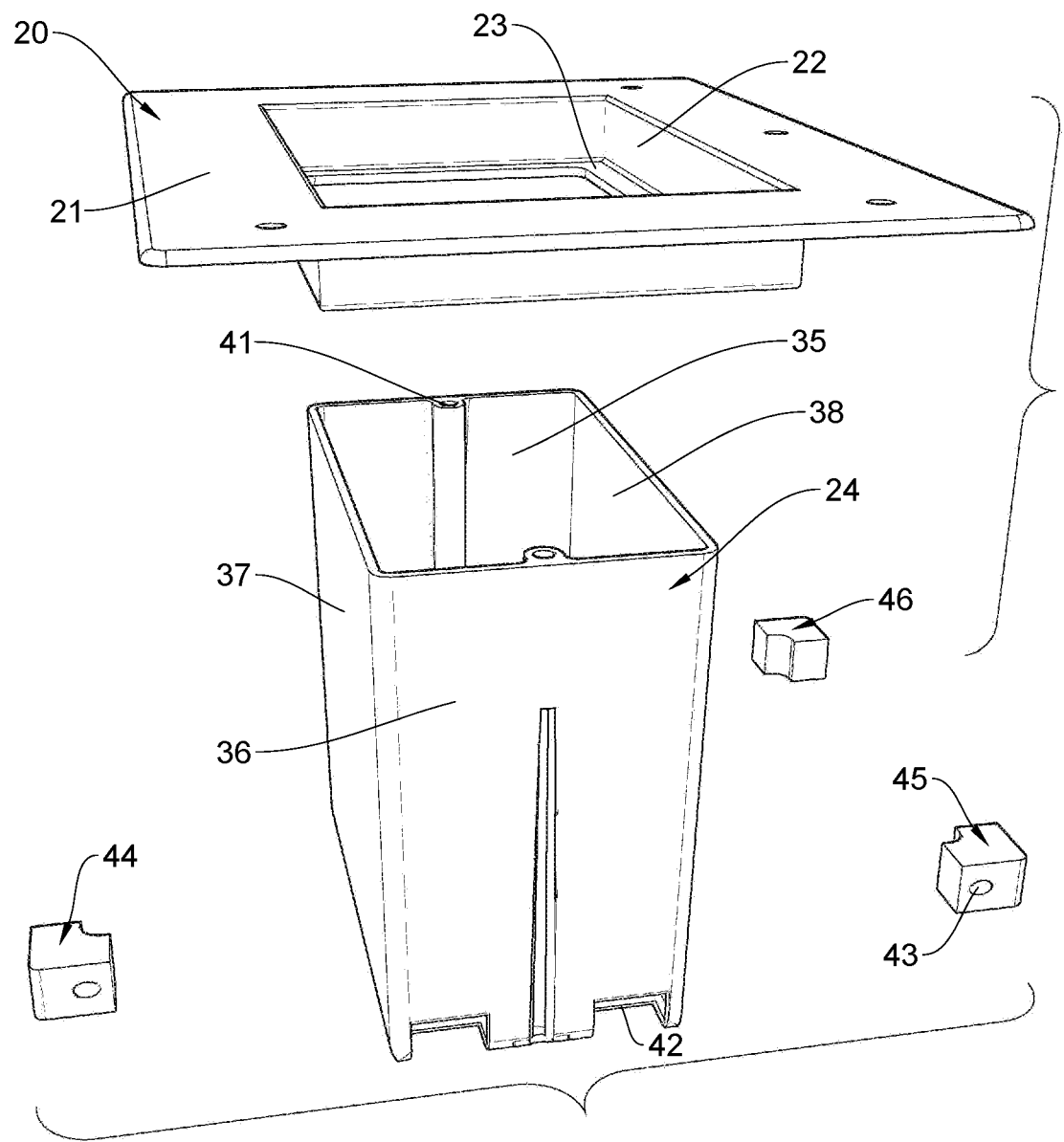
FIG. 9 is an exploded perspective view of the preferred embodiment of the invention.
Figure 21:
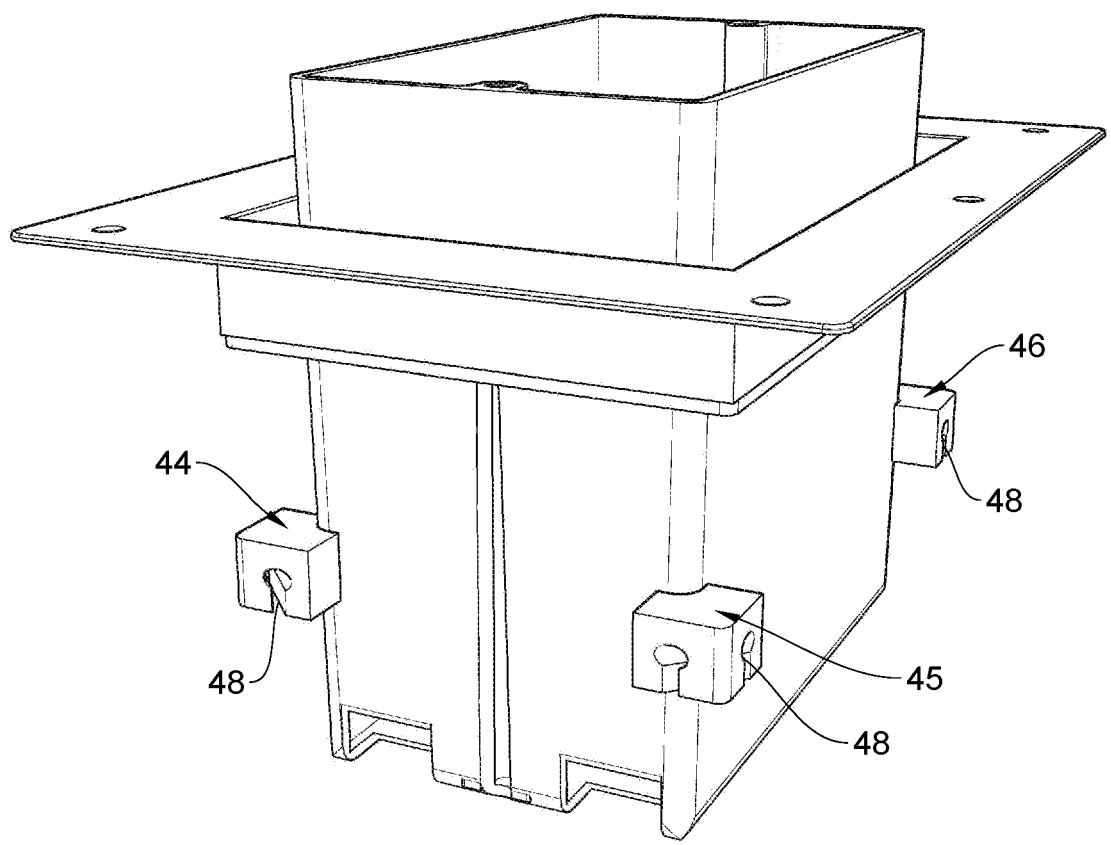
FIG. 21 is a perspective view of the multi device embodiment of the invention with modified support and fastening blocks.

The support and fastening blocks are designed to complement the flange channel and thus their width orthogonal to the box sides (49; FIGS. 1, 2, and 5 only) must be adjusted to compensate for box taper, if any. Proper width (49) allows for generally flat placement of box against framing. One side of the fastening block optionally may have a small rectangular slit (48; FIG. 21 only) to facilitate manufacture.

The preferred embodiment flange face portion (21) and alternative embodiment flange face portion (28) may have pre-formed openings (50; FIGS. 1, 3, 4, 6, 8 only) to allow fastening the entire device to framing in a more stable and precise manner and supplement or be used in lieu of the fastening provided by the support and fastening blocks.

Fasteners placed through the flange face (fasteners at face not shown in drawings) and one (51; FIGS. 17 and 18 only) through any of the support and fastening blocks 44, 45, 46, 47 in contact with framing 52 provide for secure box placement including for larger multi device boxes.

Referring to FIGS. 5, 7, 17, 18: The distance (54) from the edge of the box open face to the flange face should be determined by the thickness of the wallboard specified to properly calibrate the height of the box body edge (53) to the face of installed wallboard (55; FIGS. 17 and 18 only). This applies to both device embodiments.

Either embodiment flange face portion can optionally serve as a substrate for the pre wallboard placement of prefabricated gaskets (56; FIGS. 17 and 18 only) or seals to allow for exceptionally tight air and vapor sealing of wall assemblies in the vicinity of electrical boxes. The distance described in paragraph [0044] should consider the compressed thickness of any sealing material.

The air sealing electrical box with either flange and channel element embodiment can be manufactured by currently available precision plastic injection mold manufacturing methods including multi component injection molding (such as double shot molding and overmolding). Both are formed into the shapes shown in FIGS. 1-21 from typical thermoplastic materials including but not limited to polycarbonate, PVC, PPE blends or fiberglass reinforced polyester.

The preferred embodiment of the air sealing electrical box flange and channel element may be manufactured entirely of plastic using either of the plastic injection mold manufacturing methods of single shot or double-shot molding or overmolding.

The alternative embodiment of the air sealing electrical box flange and channel element may be manufactured of previously cited plastics or metal (generally but not limited to galvanized mild steel). The flange attachment collar may be manufactured entirely of plastic using either of the plastic injection mold manufacturing methods of single shot or multi-shot molding or overmolding.

What is claimed is:

1. An air sealing electrical box for placement in wall or ceiling assemblies, the box comprising:
    four box body sides and a back joined where they meet which together with an open face form an electrical box body, and
    a flange and channel element joined to the electrical box body, said flange and channel element further comprising:
        a flange channel bottom portion integrally connected to and proceeding distally from the box body sides in a generally orthogonal fashion,
        a flange channel outside vertical portion integrally connected to and proceeding orthogonally from a flange channel bottom portion distal edge and proceeding generally parallel to the box body sides towards the box body open face, and
        a flange face portion integrally connected to a flange channel outside vertical portion edge opposite the channel bottom portion and proceeding distally from the box body sides,
        said flange channel bottom, flange channel outside vertical and flange face portions together serving to obstruct air and/ or vapor movement at the interface between the air sealing electrical box and wall and ceiling assembly materials and serving to facilitate placement of said assembly materials.

2. The air sealing electrical box of claim 1, wherein a plurality of support and fastening blocks are joined to the electrical box body to facilitate box placement in wall and ceiling assemblies.

3. The support and fastening blocks of claim 2, wherein the blocks possess openings to receive fasteners for fastening the box to wall and ceiling assembly materials.

4. The support and fastening blocks of claim 2, further comprising a slit in the blocks to facilitate manufacture.

5. The air sealing electrical box of claim 1, wherein the flange and channel element enhances wall or ceiling assembly air and/ or vapor sealing.

6. The air sealing electrical box of claim 1, wherein the flange and channel element flange face portion provides a substrate for sealing materials.

7. The air sealing electrical box of claim 1, wherein the flange and channel element provides box placement depth calibration during attachment of box to wall and ceiling assembly materials.

8. The air sealing electrical box of claim 1, wherein the flange and channel element provides a router or cut- out tool routing guide.

9. The air sealing electrical box of claim 1, wherein the flange and channel element has pre- formed openings in the flange face portion to receive fasteners for fastening the box to wall and ceiling assembly materials.

10. The air sealing electrical box of claim 1, wherein the box body and flange and channel element are manufactured of plastic and joined to each other by single shot or double shot plastic injection mold manufacturing.

11. The electrical box of claim 1, wherein a round or ovalized cylinder and back ioined where they meet together with an open face form an electrical box body.

12. An air sealing electrical box for placement in wall or ceiling assemblies, the box comprising:
   four box body sides and a back joined where they meet which together with an open face form an electrical box body, and
   an alternative flange and channel element further comprising:
      an alternative flange channel bottom portion, an alternative flange channel outside vertical portion integrally connected to and proceeding orthogonally from an alternative flange channel bottom portion distal edge and proceeding generally parallel to the box body sides towards the box body open face, and
      an alternative flange face portion integrally connected to an alternative flange channel outside vertical portion edge opposite the alternative channel bottom portion and proceeding distally from the box body sides,
      said alternative flange channel bottom, alternative flange channel outside vertical and alternative flange face portions together serving to obstruct air and/ or vapor movement at the interface between the electrical box and wall and ceiling assembly materials and serving to facilitate placement of said assembly materials, and
   a flange attachment collar joining the electrical box body sides and the alternative flange and channel element said collar further comprising:
      a flange attachment collar bottom portion,
      a flange attachment collar top portion, and
      a flange attachment collar vertical portion.

13. The air sealing electrical box of claim 12, wherein a plurality of support and fastening blocks are joined to the electrical box body to facilitate box placement in wall and ceiling assemblies.

14. The support and fastening blocks of claim 13, wherein the blocks possess openings to receive fasteners for fastening the box to wall and ceiling assembly materials.

15. The support and fastening blocks of claim 13, further comprising a slit in the blocks to facilitate manufacture.

16. The air sealing electrical box of claim 12, wherein the alternative flange and channel element enhances wall or ceiling assembly air and/ or vapor sealing.

17. The air sealing electrical box of claim 12, wherein the alternative flange and channel element alternative flange face portion provides a substrate for sealing materials.

18. The air sealing electrical box of claim 12, wherein the alternative flange and channel element provides box placement depth calibration during attachment of box to wall and ceiling assembly materials.

19. The air sealing electrical box of claim 12, wherein the alternative flange and channel element provides a router or cut- out tool routing guide.

20. The air sealing electrical box of claim 12, wherein the alternative flange and channel element has pre- formed openings in the alternative flange face portion to receive fasteners for fastening the box to wall and ceiling assembly materials.

21. The air sealing electrical box of claim 12, wherein the box body and flange attachment collar are manufactured of plastic and the flange and channel element are manufactured of metal or plastic and joined to each other by single shot or double shot plastic injection mold manufacturing or overmolding.

22. The electrical box of claim 12, wherein a round or ovalized cylinder and back ioined where they meet together with an open face form an electrical box body.

* * * * *

UNITED STATES PATENT AND TRADEMARK OFFICE
CERTIFICATE OF CORRECTION

| | |
|---|---|
| PATENT NO. | : 11,646,558 B2 |
| APPLICATION NO. | : 17/493558 |
| DATED | : May 9, 2023 |
| INVENTOR(S) | : George Emmanuel Mon |

It is certified that error appears in the above-identified patent and that said Letters Patent is hereby corrected as shown below:

On the Title Page

In the Abstract, Line 2, insert the word --air-- after "placement provides" and before "and vapor".

Signed and Sealed this
Twenty-fourth Day of October, 2023

Katherine Kelly Vidal
*Director of the United States Patent and Trademark Office*